UNITED STATES PATENT OFFICE.

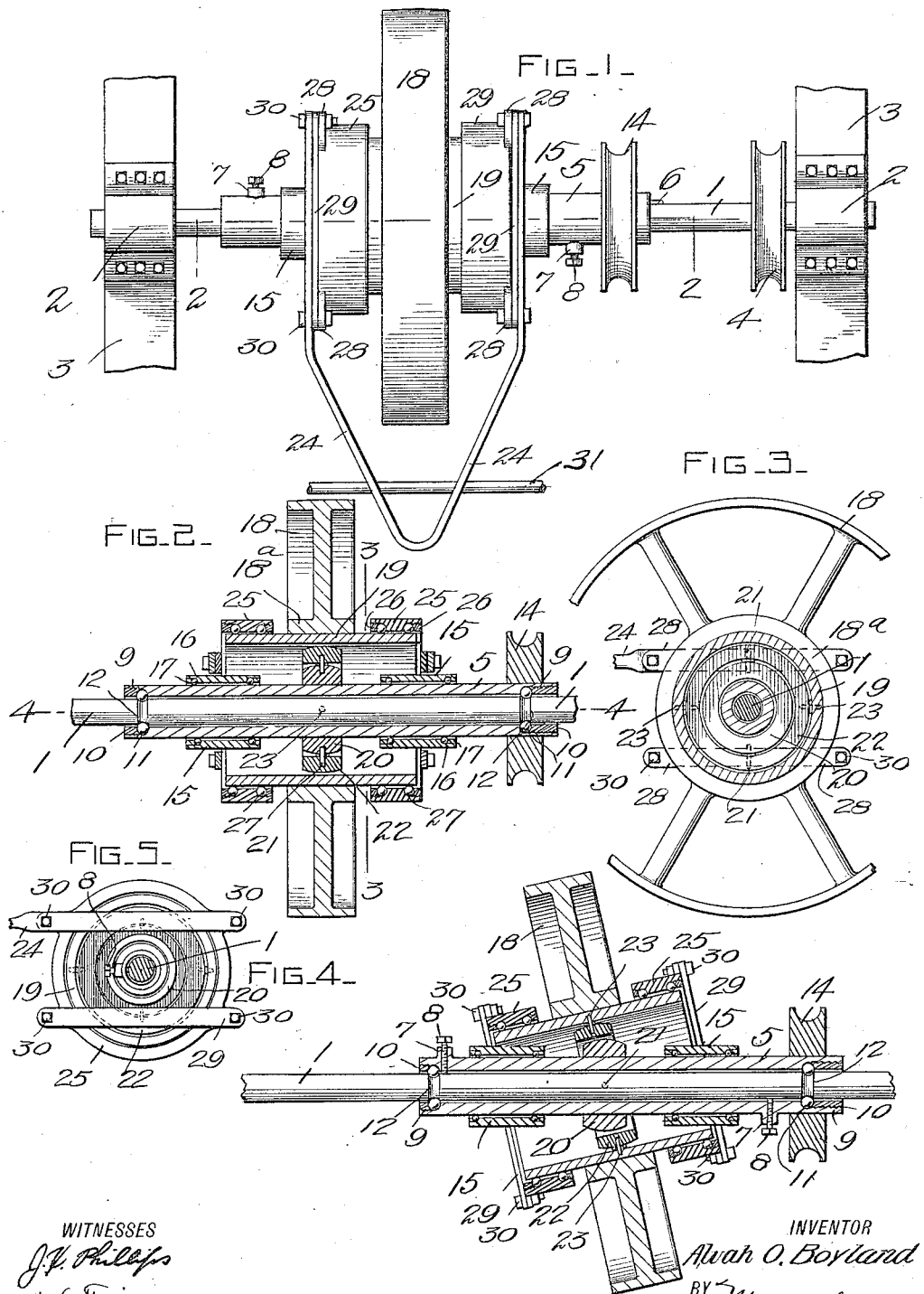

ALVAH OTIS BOYLAND, OF AURORA, NEBRASKA.

POWER-TRANSMISSION MECHANISM.

1,182,630. Specification of Letters Patent. Patented May 9, 1916.

Application filed December 19, 1914. Serial No. 878,072.

*To all whom it may concern:*

Be it known that I, ALVAH O. BOYLAND, a citizen of the United States, and a resident of Aurora, in the county of Hamilton and State of Nebraska, have invented a new and useful Improvement in Power-Transmission Mechanism, of which the following is a specification.

My invention is an improvement in transmission mechanism, and has for its object to provide a mechanism of the character specified, designed to connect a wheel or wheels to a shaft upon which the wheels are mounted for transmitting the rotation of the wheel or wheels to the shaft or that of the shaft to the wheel, and wherein the arrangement is such that the plane of the wheel or wheels may be inclined with respect to the axis of the shaft without interfering with the driving connection.

In the drawings:—Figure 1 is a top plan view of the improved mechanism, Fig. 2 is a section on the line 2—2 of Fig. 1, Figs. 3 and 4 are sections on the lines 3—3 and 4—4, respectively, of Fig. 2, and Fig. 5 is an end view of the drum.

The present embodiment of the invention is shown in connection with a section 1 of shafting, the said shafting section being journaled in bearings 2 on supports 3, and a pulley 4 is secured to the shaft near one of the bearings to permit the shaft to be rotated from a source of power not shown.

A sleeve 5 is mounted on the shaft between the bearings, and the sleeve is releasably connected with the shaft by means of set screws 8, each set screw being threaded through a nipple 7 in the sleeve, and the sleeve may be further secured to the shaft by means of a removable key 6, as shown in Fig. 1. Each end of the sleeve 5 is internally enlarged or counterbored and threaded as indicated at 9, and nuts 10 are threaded into the enlarged end of the shaft, each nut coöperating at its inner end with the annular shoulder formed by the counterboring to hold a ball bearing 11 in place. Each ball bearing also runs within an annular groove 12 in the shaft, and it will be evident that while the balls prevent longitudinal movement of the sleeve with respect to the shaft, they reduce friction between the sleeve and the shaft when the sleeve moved angularly with respect to the shaft.

A pulley 14 is secured to the end of the sleeve adjacent to the pulley 4, and bushings 15 are arranged on the sleeve 5 near each end thereof. Each of the bushings 15 has its ends internally enlarged or counterbored and threaded, and ball bearings 16 are held in the counterbored portions between the bushings 15 and the sleeve 5, by means of nuts 17, the said nuts being threaded into the counterbored portions. A wheel 18 is arranged coaxial with the shaft and sleeve, the wheel having a hub 18ª, which is mounted on a drum 19 and secured thereto. The drum is supported by the sleeve 5 and is connected thereto by a gimbal joint. The said joint comprises a collar 20, pinned to the sleeve, and a ring 22 fitting within the drum outside of the collar. The ring 22 is pinned to the collar by means of pins 21, and the ring 20 is pinned to the drum 19 by pins 23. The pins 23 are arranged in alinement diametrical to the drum, and the pins 21 are similarly arranged at right angles to the pins 23. Thus the drum may swing with respect to the shaft in every direction to change the inclination of the plane of the wheel with respect to the shaft, without interfering with the connection between the drum and the sleeve that constrains the drum to rotate with the sleeve.

A guide of approximately V-shape is connected to the drum, the said guide comprising members 24 extending at an acute angle with respect to each other and integrally connected at one end, and each member is bent slightly at its inner end to fit transversely of the adjacent end of the drum. Bushings 25 are journaled on the ends of the drum, each bushing having its ends internally enlarged and counterbored and threaded for receiving nuts 26, and the nuts hold ball bearings 27 in place between the bushings and the periphery of the drum. Each bushing is provided with perforated lugs 28 at its outer end and at its periphery, and cross bars 29 are connected with the lugs in a manner to be described. A pair of cross bars 29 is provided at each end of the drum and the members of each pair are spaced apart to form a guideway diametrical to the drum at the adjacent bushing 15. The guideways at each end are parallel, and the arms of the guide 24 are superposed on the uppermost cross bars of the pairs, and are secured to the lugs 28 and to the cross bars 29 by means of bolts and nuts 30, the bolts passing through the perforated lugs and through registering openings in the cross bars 29 and the arms 24 and being engaged by nuts as shown, to clamp the parts firmly together.

In operation power may be applied to the shaft 1 by way of the pulley 4 or to the sleeve 5, by way of the pulley 14. When the sleeve 5 is rigidly connected to the shaft by means of the key 6 or the set screws 8, it will be obvious that whether the power is applied to the pulley 4 or the pulley 14, the shaft and the sleeve will rotate together, and since the drum is connected to the sleeve by the gimbal joint the wheel 18 will rotate with the shaft and sleeve. The drum may be moved angularly with respect to the sleeve and shaft by means of the guide 24, as shown in Fig. 4. The guideways formed by the cross bars 29 limit the swinging movement of the wheel in one direction. In the opposite direction the wheel may swing freely within limits prescribed by the engagement of the ends of the drum with the bushings 15. If desired the key 6 (if used) is removed and the set screws 8 may be turned to release the sleeve from the shaft. When now power is applied to the pulley 14 the shaft 1 may be held rigid, and the sleeve 5 will drive the wheel 18. This wheel may be turned as shown in Fig. 4 in either direction to vary the inclination of the plane of the wheel with respect to its axis of rotation. The bushings 15 are held on the sleeve 5 in the same manner as the sleeve 5 is held on the shaft 1, that is, the balls of the ball bearings between the bushings and the sleeve may be in annular grooves in the sleeve. It will be understood that there is a support 31 for the end of the guide bar 24 upon which the guide rests for securing it in adjusted position, and if desired any desired means may be provided for fixing or securing the guide to the support.

I claim:—

1. Transmission mechanism comprising a shaft journaled for rotation and having means for driving the same, a sleeve detachably connected to the shaft to rotate therewith, a drum arranged coaxial with the sleeve, a wheel secured to the drum, a gimbal joint connection between the drum at the center thereof and the sleeve, said joint comprising a ring pivoted to the drum at diametrically opposite points, a bushing within the ring and pivoted thereto at diametrically opposite points and at right angles to the pivotal connection of the ring and the drum, a bushing on the sleeve at each end of the drum, a bushing journaled on each end of the drum, and a pair of parallel guide bars secured to the bushing at each end of the drum and extending transversely of the drum and spaced apart laterally from each other to form a passage at each end of the drum, said passages being parallel for constraining the shaft and sleeve to move in the same plane angularly with respect to the drum, and means connected with the last-named bushings for moving the drum.

2. Transmission mechanism comprising a shaft journaled for rotation and having means for driving the same, a sleeve detachably connected to the shaft to rotate therewith, a drum arranged coaxial with the sleeve, a wheel secured to the drum, a gimbal joint connection between the drum at the center thereof and the sleeve, a bushing on the sleeve at each end of the drum, a bushing journaled on each end of the drum, and a pair of parallel guide bars secured to the bushing at each end of the drum and extending transversely of the drum and spaced apart laterally from each other to form a passage at each end of the drum, said passages being parallel for constraining the shaft and sleeve to move in the same plane angularly with respect to the drum, and means connected with the last-named bushings for moving the drum.

3. Transmission mechanism comprising a sleeve journaled for rotation and having a pulley for connection with a source of power, a wheel having a drum hub arranged coaxial with the sleeve, a gimbal joint connection between the hub and the sleeve and within the hub, a bushing on the sleeve at each end of the drum, ball bearings between the bushing and the sleeve and arranged to prevent movement of the bushings longitudinal of the sleeve, a bushing journaled on each end of the drum, a guide supported by each bushing diametrical of the drum for engagement by the bushings to constrain the shaft to move angularly with respect to the wheel in the same plane, and means connected with the last-named bushings for moving the drum.

4. Transmission mechanism comprising a sleeve journaled for rotation and having a pulley for connection with a source of power, a wheel having a drum hub arranged coaxial with the sleeve, a gimbal joint connection between the hub and the sleeve and within the hub, a bushing journaled on each end of the drum, a guide supported by each bushing diametrical of the drum for engagement by the bushings to constrain the shaft to move angularly with respect to the wheel in the same plane, and means connected with the last-named bushings for moving the drum.

5. Transmission mechanism, comprising a shaft journaled for rotation, a wheel arranged coaxial with the shaft, a gimbal joint connection between the wheel and the shaft, and means for moving the wheel angularly with respect to the shaft, and means in connection with the shaft and wheel for constraining the axis of the wheel to move in the same plane.

ALVAH OTIS BOYLAND.

Witnesses:
DUDLEY A. DALE,
HENRY PETERSON.

Copies of this patent may be obtained for five cents each, by addressing the "Commissioner of Patents, Washington, D. C."